(12) United States Patent
Yin et al.

(10) Patent No.: US 11,703,322 B2
(45) Date of Patent: Jul. 18, 2023

(54) METHOD FOR MEASURING BLADE CROSS-SECTION PROFILE BASED ON LINE STRUCTURED-LIGHT SENSOR AT HIGH PRECISION

(71) Applicant: Sichuan University, Chengdu (CN)

(72) Inventors: Ming Yin, Chengdu (CN); Dengying Ou, Chengdu (CN); Zongping Wang, Chengdu (CN); Haohao Liu, Chengdu (CN); Luofeng Xie, Chengdu (CN); Guofu Yin, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 66 days.

(21) Appl. No.: 17/392,528

(22) Filed: Aug. 3, 2021

(65) Prior Publication Data

US 2022/0120556 A1    Apr. 21, 2022

(30) Foreign Application Priority Data

Oct. 21, 2020  (CN) .......................... 202011128989.6

(51) Int. Cl.
*G01B 11/24*    (2006.01)
(52) U.S. Cl.
CPC .................... *G01B 11/24* (2013.01)
(58) Field of Classification Search
CPC .......... A61K 8/64; A61Q 17/00; A61Q 19/00; A61Q 5/00; C07K 5/06; C07K 5/08; C07K 5/10; C09K 3/00; G01B 11/24; G01B 11/2518; G01B 21/042; Y02A 50/30
USPC .................................................. 356/600–640
See application file for complete search history.

(56) References Cited

U.S. PATENT DOCUMENTS

2021/0187687 A1*  6/2021  Stein ...................... B24B 41/06

* cited by examiner

*Primary Examiner* — Tri T Ton
(74) *Attorney, Agent, or Firm* — CRGO Global; Steven M. Greenberg (57) ABSTRACT

The present disclosure provides a method for measuring a blade cross-section profile based on a line structured-light sensor at a high precision, including: (10) pose calibration on a line structured-light sensor; (20) calibration on a rotation axis: calibrating the rotation axis with a lateral datum plane of a blade; and (30) cross-section profile measurement on a target measured blade: establishing a global coordinate system, and converting blade cross-section curve feature data acquired by a data coordinate system to the coordinate system for splicing, thereby measuring a blade cross-section profile. The present disclosure reduces the error arising from transfer of calibration objects, reduces the rotation error because it does not involve the rotation angle of the turntable when calibrating the rotation axis and the rotation center, and reduces the translational error of the line structured-light sensor as positions for rotating the line structured-light sensor in two times are unchanged.

5 Claims, 8 Drawing Sheets

METHOD FOR MEASURING BLADE CROSS-SECTION PROFILE BASED ON LINE STRUCTURED-LIGHT SENSOR AT HIGH PRECISION

CROSS REFERENCE TO RELATED APPLICATION

This patent application claims the benefit and priority of Chinese Patent Application No. 202011128989.6, filed on Oct. 21, 2020, the disclosure of which is incorporated by reference herein in its entirety as part of the present application.

BACKGROUND OF THE INVENTION

Field of the Invention

The present disclosure belongs to the field of blade profile measurement, and in particular, relates to a method for measuring a blade cross-section profile based on a line structured-light sensor at a high precision.

Description of the Related Art

Blades are core components of aviation engines, gas turbines, steam turbines and other devices, and play a vital role in conversion from heat energy to mechanical energy. The profile and quality of the blades directly affect the energy conversion efficiency and service life of the complete machines. The blades are difficulty to be measured because the cross sections are irregularly free-from surfaces and each cross-section profile is different.

A Chinese invention patent 201911267259.1 discloses a method for measuring a blade based on a line structured-light sensor. The measurement method includes: (1) calibration on a measurement apparatus before blade installation: calibrating moving axes X and Y of a line structured-light sensor, calibrating a moving axis Z with a rectangular calibration block, and calibrating a turntable plane with an angular sensor; (2) calibration on a blade axis after the blade installation, and calibration on the blade axis with blade datum planes A and B (two lateral datum planes); and (3) measurement on a target measured blade. The method calibrates a rotation axis with the angular sensor and the curve feature of the blade, and overcomes the transfer error arising from a conventional criterion sphere. However, with cumbersome operation steps, the method is not applicable to measuring blade cross-section curve having large curvatures, and has the large measurement errors.

BRIEF SUMMARY OF THE INVENTION

An objective of the present disclosure is to provide a method for measuring a blade cross-section profile based on a line structured-light sensor at a high precision, which is simple in operation and applicable to measuring various blades.

A method for measuring a blade cross-section profile based on a line structured-light sensor at a high precision includes the following steps:

(10) pose calibration on a line structured-light sensor: calibrating X, Y and Z axes of a moving coordinate system, such that a data coordinate system o-xyz of the line structured-light sensor is parallel to the moving coordinate system O-XYZ;

(20) calibration on a rotation axis: calibrating the rotation axis of a turntable, such that a blade axis is parallel to the rotation axis; and (30) cross-section profile measurement on a target measured blade: establishing a global coordinate system, and converting blade cross-section curve feature data acquired by the data coordinate system to the coordinate system for splicing, thereby measuring a blade cross-section profile;

where the calibration on a rotation axis in step (20) includes the following steps:

(21) putting the target measured blade onto the turntable, and adjusting a pose of the line structured-light sensor such that a laser plane of the line structured-light sensor intersects with a lateral datum plane of the blade, the line structured-light sensor acquiring profile point data $M_1$ of the datum plane;

(22) ensuring that the pose of the line structured-light sensor is unchanged, and the line structured-light sensor acquires profile point data $M_2$ of a lateral datum plane after rotation of the turntable; and rotating the turntable again and ensuring that the pose of the line structured-light sensor is unchanged, and the line structured-light sensor acquires profile point data $M_3$ of the lateral datum plane, where the lateral datum planes in step (21) and step (22) are the same datum plane;

(23) fitting the data $M_1$, $M_2$ and $M_3$ linearly to obtain three straight lines $L_1$, $L_2$ and $L_3$, and solving, according to equal distances from a rotation center point $O_1$ to the three straight lines $L_1$, $L_2$ and $L_3$, the rotation center point $O_1$;

(24) moving the line structured-light sensor along the Z-axis of the moving coordinate system, such that the laser plane of the line structured-light sensor intersects with the lateral datum plane of the blade, and repeating steps (21)-(23) to obtain a rotation center point $O_2$; and (25) solving a space linear equation of the rotation axis through the rotation center points $O$ and $O_2$, where a deflection angle of the rotation axis is calculated according to the space linear equation, and a turntable plane is adjusted according to the deflection angle, thereby calibrating the turntable plane and the rotation axis at the same time.

Further, a micro-adjustment mechanism may be mounted on a bottom surface of the turntable, the micro-adjustment mechanism may include an X-axis inclinometer and a Y-axis inclinometer that are stacked up and down, and the X-axis inclinometer and the Y-axis inclinometer may be adjusted according to the deflection angle of the rotation axis in step (25) to calibrate the turntable plane and the rotation axis.

Further, the deflection angle in step (25) may include a deflection angle $$\alpha = \arctan\frac{y_2 - y_1}{L_z}$$

of the rotation axis in a yoz plane of the data coordinate system, and a deflection angle $$\beta = \arctan\frac{x_2 - x_1}{L_z}$$

of the rotation axis in an xoz plane of the data coordinate system, where $x_1$ and $y_1$ are coordinate data of the rotation center point $O_1$, $x_2$ and $y_2$ are coordinate data of the rotation center point $O_2$, and $L_z$ is a motion distance of the line structured-light sensor on the Z-axis in step (24).

Further, the calibration on a rotation axis in step (20) may further include the following step:

(26) moving the line structured-light sensor along the Z-axis of the moving coordinate system, such that the laser plane of the line structured-light sensor coincides with a horizontal datum plane and the lateral datum plane of the blade, and repeating steps (21)-(24) to obtain rotation center points $O_3$ and $O_4$, the rotation center points $O_3$ and $O_4$ having equal coordinate data x and y, thereby inspecting the rotation axis of the blade.

Compared with the prior art, the present disclosure reduces the error arising from transfer of calibration objects owing to no introduction of external calibration objects, reduces the rotation error because it does not involve the rotation angle of the turntable when calibrating the rotation axis and the rotation center, and reduces the translational error of the line structured-light sensor as positions for rotating the line structured-light sensor in two times are unchanged. Meanwhile, the present disclosure calibrates the rotation axis with a high-precision datum plane, which not only reduces calibration steps before blade measurement, but also minimizes a data error after calibration and makes the measurement on the blade cross-section curve more accurate.

DETAILED DESCRIPTION OF THE EMBODIMENTS

The embodiment provides a method for measuring a blade cross-section profile based on a line structured-light sensor at a high precision. The method discloses a method for calibrating a rotation axis with a blade self-feature (a lateral datum plane). Compared with the prior art, the calibration method achieves a wider serviceable range, and more accurate measurement data. Self-features of the blade 200 refer to a lateral datum plane A201, a datum plane B202 and a horizontal datum plane C203 that are machined during machining of the blade 200. The datum plane A201 intersects with the datum plane B202 and is perpendicular to the datum plane C203. As common features of all blades 200, and having the high planeness, the self-features may be viewed as high-precision plane features. The method in the embodiment calibrates a rotation center and a rotation axis 300 by using characteristics of either the datum plane A201 or the datum plane B202.

The method for measuring a blade cross-section profile based on a line structured-light sensor at a high precision provided by the embodiment includes the following steps:

(10) Calibration on a line structured-light sensor

Figure 1:
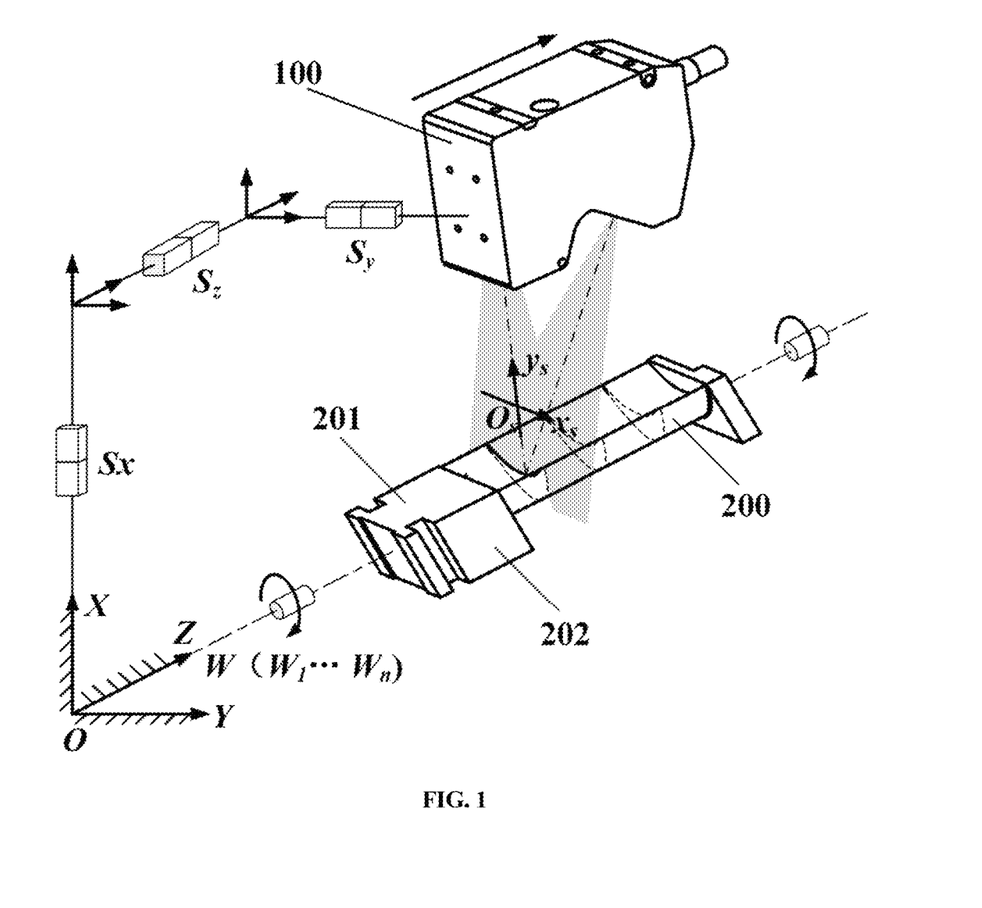
FIG. 1 is a simplified structural schematic diagram of a four-axis measurement system.

As shown in FIG. 1, the measurement apparatus includes a line structured-light sensor 100, a translational drive ($S_X$, $S_Y$, $S_Z$) for controlling motion of the line structured-light sensor within a moving coordinate system O-XYZ, and a rotational drive W for controlling rotation of a turntable 400. The turntable has a rotation center certainly. There is a need to calibrate a pose of the line structured-light sensor 100 before installation of the blade 200, to ensure the subsequent acquisition accuracy. The calibration method is the same as the prior art, and will not be repeated in the embodiment.

Figure 2:
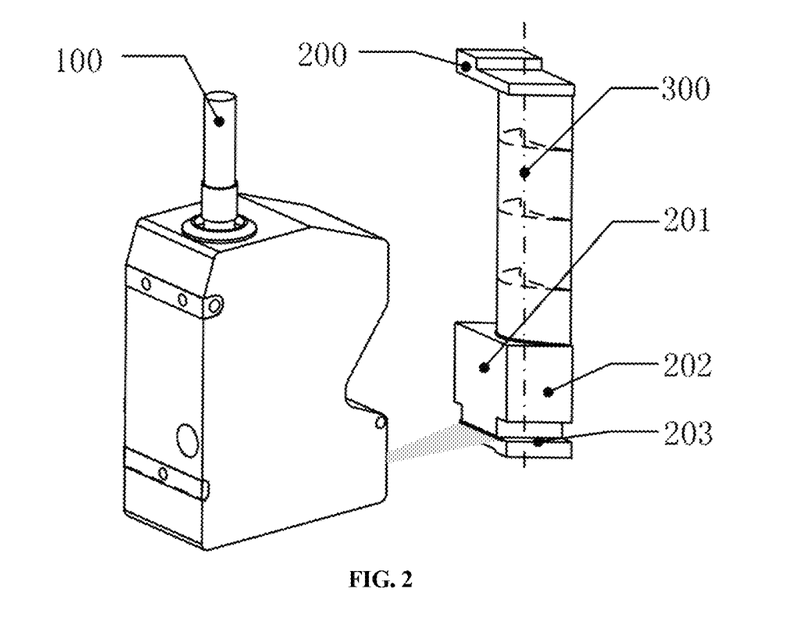
FIG. 2 is a schematic diagram of a positional relationship between a line structured-light sensor and a target measured blade.
Figure 3:
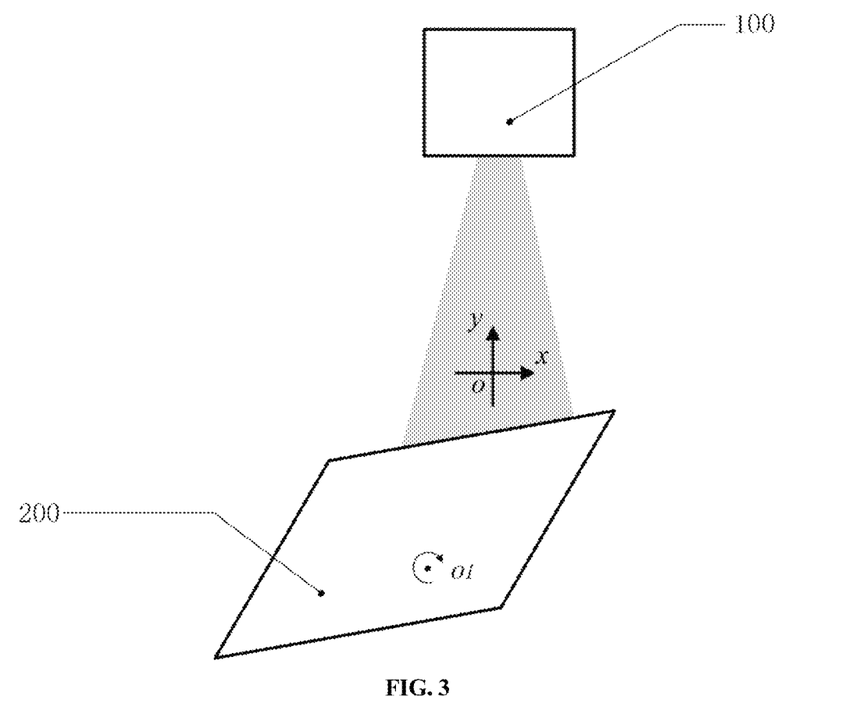
FIG. 3 is a structural schematic diagram for acquiring data $M_1$ of a datum plane A for a first time according to the present disclosure.

(20) Calibration on a rotation axis (21) Put the target measured blade 100 in a center of the turntable, and adjust the pose of the line structured-light sensor 100 by controlling the translational drive ($S_X$, $S_Y$, $S_Z$) such that a laser plane of the line structured-light sensor 100 intersects with the datum plane A201. As shown in FIG. 2, the blade is provided with two lateral datum planes A201 and B202 and the horizontal datum plane C203. The embodiment selects the blade datum plane A201, and will use the datum plane B202 with the same principles and steps. The embodiment controls the translational drive $S_X$ to move $\Delta X_1$, the translational drive $S_y$ to move $\Delta Y_1$, the translational drive $S_Z$ to move $\Delta Z_1$ and the turntable to rotate $\theta$, such that laser lines of the line structured-light sensor 100 are located on the datum plane A201, and the line structured-light sensor 100 acquires profile point data $M_1$ on the datum plane A201, as shown in FIG. 3. Empty points and points not within the datum plane A201 are taken as invalid points, and point cloud data $$M_1 = \begin{bmatrix} M_1x_1 & M_1x_2 & \ldots & M_1x_{e1} \\ M_1y_1 & M_1y_2 & \ldots & M_1y_{e1} \end{bmatrix}$$

behind the invalid points is removed.

(22) In order to reduce the error accumulation, ensure that the pose of the line structured-light sensor 100 is unchanged, and after the turntable rotates $\theta$, a rotation angle is not too large, and the laser plane of the line structured-light sensor 100 still intersects with the datum plane A201. As shown in FIG. 3, the line structured-light sensor 100 acquires profile point data $M_2$ of the datum plane A201 again, $$M_2 = \begin{bmatrix} M_2x_1 & M_2x_2 & \ldots & M_2x_{e2} \\ M_2y_1 & M_2y_2 & \ldots & M_2y_{e2} \end{bmatrix}.$$

Figure 4:
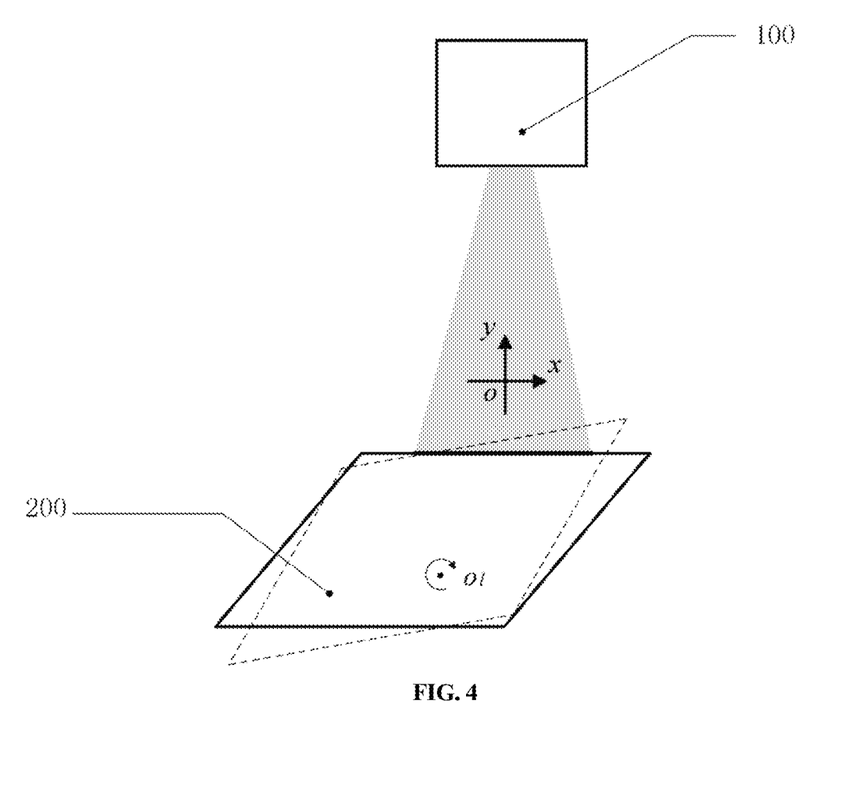
FIG. 4 is a structural schematic diagram for acquiring data $M_2$ of a datum plane A for a second time according to the present disclosure.

Similarly, rotate the turntable again in a case where the pose of the line structured-light sensor 100 is unchanged, and ensure that the laser plane of the line structured-light sensor 100 still intersects with the datum plane A201. As shown in FIG. 4, the line structured-light sensor 100 acquires profile point data $M_3$ of the datum plane A201 again $$M_3 = \begin{bmatrix} M_3x_1 & M_3x_2 & \ldots & M_3x_{e3} \\ M_3y_1 & M_3y_2 & \ldots & M_3y_{e3} \end{bmatrix}.$$

(23) As the datum plane of the blade has the high linearity, fit the data $M_1$, $M_2$ and $M_3$ linearly to obtain three straight lines $L_1$, $L_2$ and $L_3$. Since the pose of the line structured-light sensor is unchanged, data coordinate systems for the data $M_1$, $M_2$ and $M_3$ in three times pertain to the same data coordinate system o-xy and thus distances $d_1$, $d_2$ and $d_3$ from the rotation center point $O_1$ to the three straight lines $L_1$, $L_2$ and $L_3$ are equal. Therefore, the rotation center point $O_1$ may be solved.

Perform fitting by using a function $$\min F(A, B) = \sum_{i=1}^{\varepsilon} [(Ax_i + B) - y_i]^2,$$

$(x_i, y_i)$ being an ith data coordinate in the data $M_1$, $M_2$ and $M_3$, to obtain linear equations of the $L_1$, $L_2$ and $L_3$ in the data coordinate system o-xy:

$$L_1: y = A_1 x + B_1$$
$$L_2: y = A_2 x + B_2$$
$$L_3: y = A_3 x + B_3$$

Set the coordinate of the rotation center point $O_1$ in the data coordinate system o-xy as $(x_1, y_1)$, then the distances of the three fitting straight lines $L_1$, $L_2$ and $L_3$ to the point $O_1$ $(x_1, y_1)$ are:

$$\begin{cases} d_1 = \left| \dfrac{A_1 x_1 + B_1 y_1 + C_1}{\sqrt{A_2^2 + B_2^2}} \right| \\ d_2 = \left| \dfrac{A_2 x_1 + B_2 y_1 + C_2}{\sqrt{A_2^2 + B_2^2}} \right| \\ d_3 = \left| \dfrac{A_3 x_1 + B_3 y_1 + C_3}{\sqrt{A_2^2 + B_2^2}} \right| \end{cases}$$

The two equations can be combined to solve the coordinate $(x_1, y_1)$ of the $O_1$ point.

With the moving coordinate system O-XYZ when the laser plane of the line structured-light sensor coincides with the blade datum plane C as an origin, the coordinate of the $O_1$ point in the spliced coordinate system O-XYZ is $O_1$: $(\Delta X_1 + x_1, \Delta Y_1 + y_1, \Delta Z_1)$, $X_1$, $Y_1$ and $Z_1$ being coordinates in the moving coordinate system O-XYZ when the line structured-light sensor acquires the data $M_1$.

Figure 5:
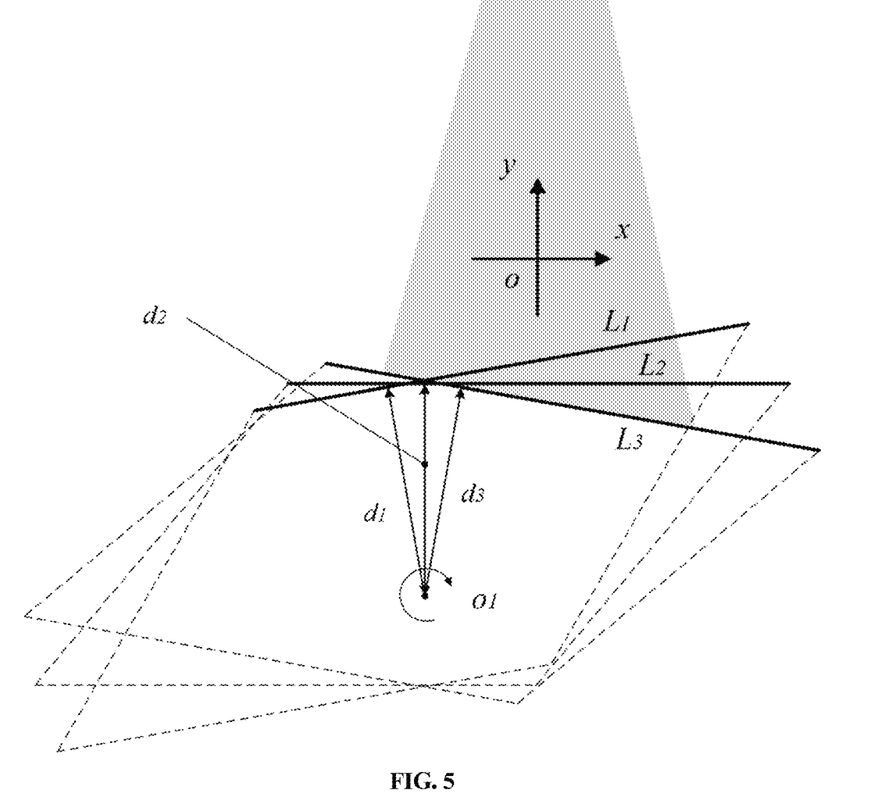
FIG. 5 is a structural schematic diagram for acquiring data $M_3$ of a datum plane A for a third time according to the present disclosure.

(24) Move the line structured-light sensor along the Z-axis of the moving coordinate system at a motion distance of $L_Z$, as shown in FIG. 5, and repeat Steps (21)-(23) to obtain a rotation center point $O_2$, the coordinate of the $O_2$ point in the moving coordinate system O-XYZ being $O_2$: $(\Delta X_1 + x_2, \Delta Y_1 + y_2, \Delta Z_1 + L_Z)$.

Figure 6:
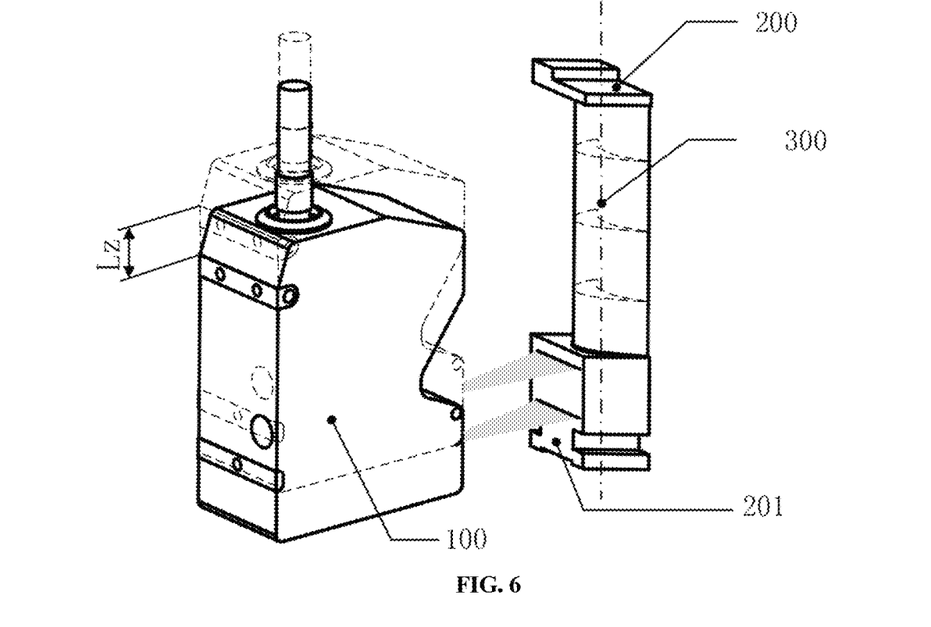
FIG. 6 is a schematic diagram of a positional relationship of a line structured-light sensor on a Z axis in two times by controlling translation according to the present disclosure.
Figure 7:
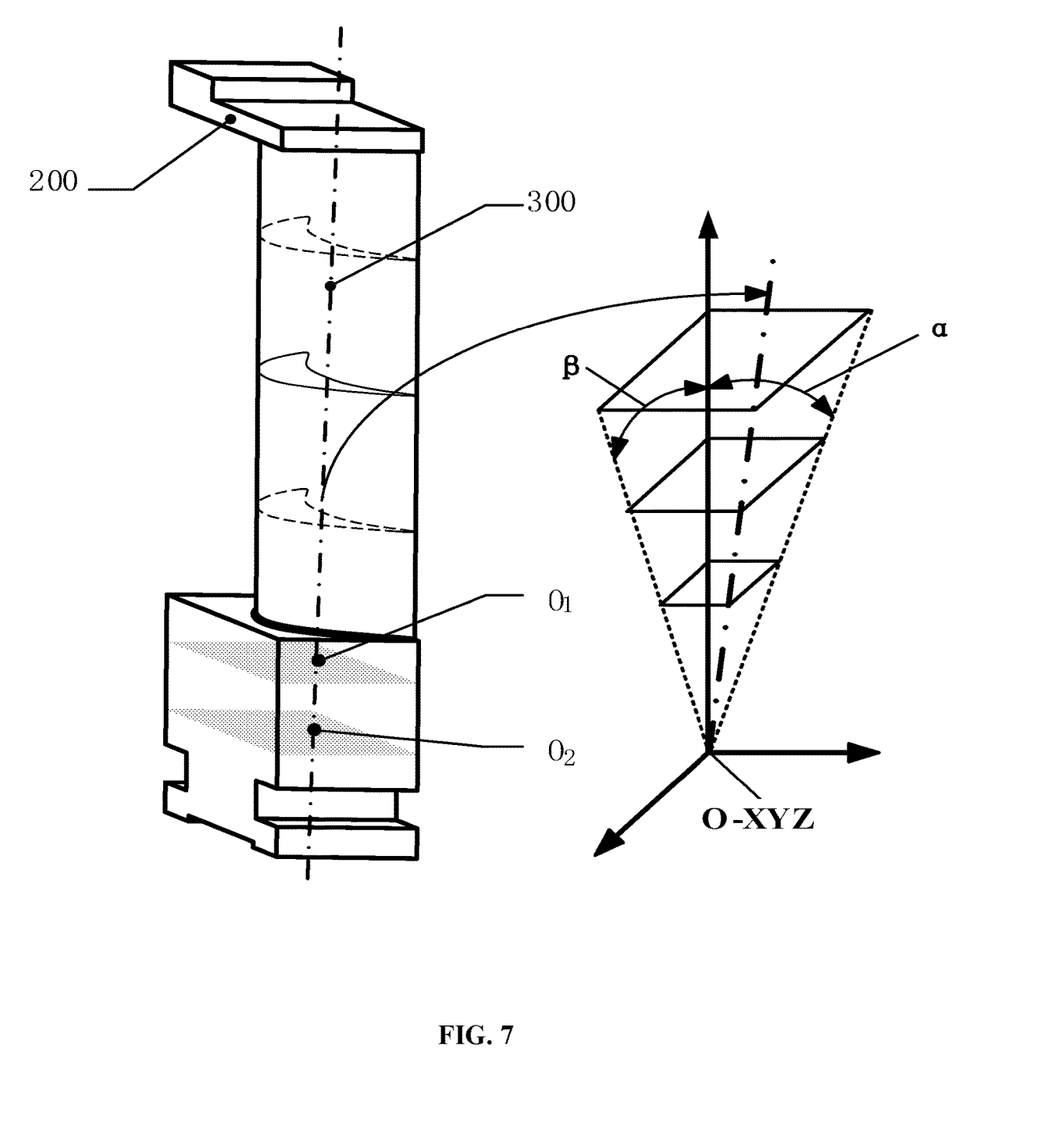
FIG. 7 is a schematic diagram of calibration of a rotation axis according to the present disclosure.

(25) As shown in FIG. 6 and FIG. 7, solve a space linear equation of the rotation axis through the rotation center points $O_1$ and $O_2$:

$$\frac{x - \Delta X_1 - x_1}{x_2 - x_1} = \frac{y - \Delta Y_1 - y_1}{y_2 - y_1} = \frac{z - \Delta Z_1}{L_Z}$$

With the space linear equation of the rotation axis of the blade 200 in the spliced coordinate system, the deflection angle of the rotation axis of the blade in the YOZ plane may be calculated as $$\alpha = \arctan \frac{y_2 - y_1}{L_z},$$

and the deflection angle of the rotation axis of the blade in the XOZ plane may be calculated as $$\beta = \arctan \frac{x_2 - x_1}{L_z}.$$

Figure 8:
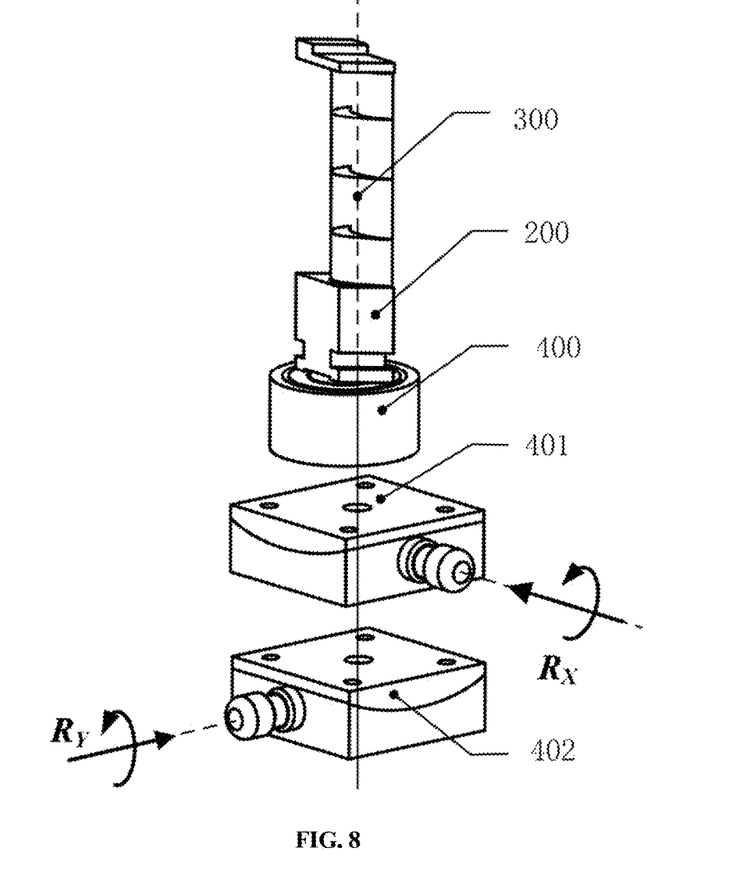
FIG. 8 is a schematic diagram of a micro-adjustment mechanism according to the present disclosure.

Through the micro-adjustment X-axis inclinometer 401 or Y-axis inclinometer 402 under the blade 200, as shown in FIG. 8, the angle of the blade is adjusted with the adjustment on $R_X$ or $R_Y$, such that the rotation axis 300 of the blade 200 is located in a vertical direction.

(26) Move the line structured-light sensor 100 along the Z-axis of the moving coordinate system, such that the laser plane of the line structured-light sensor 100 coincides with the horizontal datum plane and the lateral datum plane of the blade, and repeat Steps (21)-(24) to obtain rotation center points $O_3$ and $O_4$, the rotation center points $O_3$ and $O_4$ having equal coordinate data (x, y), thereby inspecting the rotation axis of the blade.

(30) Measurement on a target measured blade (31) Establish a global coordinate system O-XYZ, with an intersection point between a datum plane C of the target measured blade and the rotation axis as an origin O, two normal vectors perpendicular to each other on the datum plane C as X and Y axes, and the rotation axis as a Z axis.

(32) Acquire data at different positions of the target measured blade 200 by moving the line structured-light sensor 100 and rotating the turntable, and convert the acquired data to the global coordinate system O-XYZ for data splicing, thereby implementing the measurement on a profile of the target measured blade.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

What is claimed is:

1. A method for measuring a blade cross-section profile based on a line structured-light sensor at a high precision, comprising the following steps:

(10) a step of pose calibration on a line structured-light sensor: calibrating X, Y and Z axes of a moving coordinate system, such that a data coordinate system o-xyz of the line structured-light sensor is parallel to the moving coordinate system O-XYZ;

(20) a step of calibration on a rotation axis: calibrating the rotation axis of a turntable, such that a blade axis is parallel to the rotation axis; and (30) a step of cross-section profile measurement on a target measured blade: establishing a global coordinate system, and converting blade cross-section curve feature data acquired by the data coordinate system to the coordinate system for splicing, thereby measuring a blade cross-section profile;

wherein the calibration on a rotation axis in step (20) comprises the following steps:

(21) putting the target measured blade onto the turntable, and adjusting a pose of the line structured-light sensor such that a laser plane of the line structured-light sensor intersects with a lateral datum plane of the blade, the line structured-light sensor acquiring profile point data $M_1$ of the datum plane;

(22) ensuring that the pose of the line structured-light sensor is unchanged, and the line structured-light sensor acquires profile point data $M_2$ of a lateral datum plane after rotation of the turntable; and rotating the turntable again and ensuring that the pose of the line structured-light sensor is unchanged, and the line structured-light sensor acquires profile point data $M_3$ of the lateral datum plane, wherein the lateral datum planes in step (21) and step (22) are the same datum plane;

(23) fitting the data $M_1$, $M_2$ and $M_3$ linearly to obtain three straight lines $L_1$, $L_2$ and $L_3$, and solving, according to equal distances from a rotation center point $O_1$ to the three straight lines $L_1$, $L_2$ and $L_3$, the rotation center point $O_1$ wherein the fitting is performed by $$\min F(A, B) = \sum_{i=1}^{\varepsilon} [(Ax_i + B) - y_i]^2,$$

and wherein $(x_i, y_i)$ is an $i^{th}$ data coordinate in the data $M_1$, $M_2$ and $M_3$, $x_i$ is an x-coordinate of the $i^{th}$ data coordinate, $y_i$ is a y-coordinate of the $i^{th}$ data coordinate, A is a slope of a straight line according to the fitting of the data $M_1$, $M_2$ and $M_3$, and B is a y-intercept of the straight line according to the fitting of the data $M_1$, $M_2$ and $M_3$; and the three straight lines $L_1$, $L_2$ and $L_3$ is as following in the data coordinate system o-xy:

$$L_1 : y = A_1 x + B_1$$
$$L_2 : y = A_2 x + B_2 ;$$
$$L_3 : y = A_3 x + B_3$$

wherein a coordinate of the rotation center point $O_1$ in the data coordinate system o-xy is $(x_1, y_1)$, distances of the three straight lines $L_1$, $L_2$ and $L_3$ to the rotation center point $O_1$ are respectively:

$$\begin{cases} d_1 = \left| \dfrac{A_1 x_1 + B_1 y_1 + C_1}{\sqrt{A_2^2 + B_2^2}} \right| \\ d_2 = \left| \dfrac{A_2 x_1 + B_2 y_1 + C_2}{\sqrt{A_2^2 + B_2^2}} \right| , \\ d_3 = \left| \dfrac{A_3 x_1 + B_3 y_1 + C_3}{\sqrt{A_2^2 + B_2^2}} \right| \end{cases}$$

the coordinate of the rotation center point $O_1$ is solved by combining two of the distances $d_1$, $d_2$ and $d_3$;

(24) moving the line structured-light sensor along the Z-axis of the moving coordinate system, such that the laser plane of the line structured-light sensor intersects with the lateral datum plane of the blade, and repeating steps (21)-(23) to obtain a rotation center point $O_2$; and (25) solving a space linear equation of the rotation axis through the rotation center points $O_1$ and $O_2$, wherein the space linear equation of the rotation axis is $$\frac{x - \Delta X_1 - x_1}{x_2 - x_1} = \frac{y - \Delta Y_1 - y_1}{y_2 - y_1} = \frac{z - \Delta Z_1}{L_Z},$$

wherein a coordinate of the rotation center point $O_2$ in the data coordinate system o-xy is $(x_2, y_2)$, $\Delta X_1$, $\Delta Y_1$ and $\Delta Z_1$ are coordinates in the moving coordinate system O-XYZ when the line structured-light sensor acquires the data $M_1$, and $L_Z$ is a motion distance of the line structured-light sensor moving along the Z-axis of the coordinate system;

wherein a deflection angle of the rotation axis is calculated according to the space linear equation, and a turntable plane is adjusted according to the deflection angle, thereby calibrating the turntable plane and the rotation axis at the same time.

2. The method for measuring a blade cross-section profile based on a line structured-light sensor at a high precision according to claim 1, wherein a micro-adjustment mechanism is mounted on a bottom surface of the turntable, the micro-adjustment mechanism comprises an X-axis inclinometer and a Y-axis inclinometer that are stacked up and down, and the X-axis inclinometer and the Y-axis inclinometer are adjusted according to the deflection angle of the rotation axis in step (25) to calibrate the turntable plane and the rotation axis.

3. The method for measuring a blade cross-section profile based on a line structured-light sensor at a high precision according to claim 1, wherein the deflection angle in step (25) comprises a deflection angle $$\alpha = \arctan \frac{y_2 - y_1}{L_z}$$

of the rotation axis in a yoz plane of the data coordinate system, and a deflection angle $$\beta = \arctan\frac{x_2 - x_1}{L_z}$$

of the rotation axis in an xoz plane of the data coordinate system, wherein $x_1$ and $y_1$ are coordinate data of the rotation center point $O_1$, $x_2$ and $y_2$ are coordinate data of the rotation center point $O_2$, and $L_z$ is a motion distance of the line structured-light sensor on the Z-axis in step (24).

4. The method for measuring a blade cross-section profile based on a line structured-light sensor at a high precision according to claim 2, wherein the deflection angle in step (25) comprises a deflection angle $$\alpha = \arctan\frac{y_2 - y_1}{L_z}$$

of the rotation axis in a yoz plane of the data coordinate system, and a deflection angle $$\beta = \arctan\frac{x_2 - x_1}{L_z}$$

of the rotation axis in an xoz plane of the data coordinate system, wherein $x_1$ and $y_1$ are coordinate data of the rotation center point $O_1$, $x_2$ and $y_2$ are coordinate data of the rotation center point $O_2$, and $L_z$ is a motion distance of the line structured-light sensor on the Z-axis in step (24).

5. The method for measuring a blade cross-section profile based on a line structured-light sensor at a high precision according to claim 1, wherein the calibration on a rotation axis in step (20) further comprises the following step:
 (26) moving the line structured-light sensor along the Z-axis of the moving coordinate system, such that the laser plane of the line structured-light sensor coincides with a horizontal datum plane and the lateral datum plane of the blade, and repeating steps (21)-(24) to obtain rotation center points $O_3$ and $O_4$, the rotation center points $O_3$ and $O_4$ having equal coordinate data x and y, thereby inspecting the rotation axis of the blade.

\* \* \* \* \*